(12) United States Patent
Chen

(10) Patent No.: US 9,130,333 B2
(45) Date of Patent: Sep. 8, 2015

(54) CABLE INSTALLATION TOOL

(71) Applicant: Wistron Corporation, New Taipei (TW)

(72) Inventor: Xing-Yang Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 213 days.

(21) Appl. No.: 14/059,419

(22) Filed: Oct. 21, 2013

(65) Prior Publication Data

US 2015/0059168 A1    Mar. 5, 2015

(30) Foreign Application Priority Data

Sep. 5, 2013    (CN) .......................... 2013 1 0400365

(51) Int. Cl.
 *B23P 19/00* (2006.01)
 *H01R 43/00* (2006.01)
 *H01R 43/26* (2006.01)
 *H02G 1/00* (2006.01)
(52) U.S. Cl.
 CPC . *H01R 43/26* (2013.01); *H02G 1/00* (2013.01)
(58) Field of Classification Search
 CPC .......... H01R 43/00; H01R 43/26; H02G 1/00; Y10T 29/5171; Y10T 29/5176; Y10T 29/5177; Y10T 29/517; Y10T 29/5187; Y10T 29/53048; Y10T 29/53091; Y10T 29/5313; Y10T 29/53174; Y10T 29/53187; Y10T 29/53222; Y10T 29/53274; Y10T 29/53943; Y10T 29/53961
 USPC .......... 29/52, 54, 56.6, 33 F, 33 K, 711, 721, 29/729, 739, 742, 748, 760, 762, 278
 See application file for complete search history.

(56) References Cited

U.S. PATENT DOCUMENTS

| | | | | |
|---|---|---|---|---|
| 4,250,772 | A * | 2/1981 | Graber | 81/9.51 |
| 4,441,386 | A * | 4/1984 | Hara | 81/9.51 |
| 4,479,301 | A * | 10/1984 | Resch | 29/721 |
| 4,811,633 | A * | 3/1989 | Bueschel et al. | 81/9.51 |
| 5,125,259 | A * | 6/1992 | Meyer et al. | 72/409.12 |
| 5,460,069 | A * | 10/1995 | Sayyadi et al. | 83/171 |
| 6,176,155 | B1 * | 1/2001 | Palmowski et al. | 81/9.51 |
| 6,840,147 | B2 * | 1/2005 | Palmowski | 83/580 |

* cited by examiner

*Primary Examiner* — Paul D Kim
(74) *Attorney, Agent, or Firm* — Winston Hsu; Scott Margo

(57) ABSTRACT

A cable installation tool includes a baseboard having a containing space for containing a circuit board, a support base disposed on the baseboard, a sliding base slidably disposed on the baseboard and located at a side of the support base, a sliding rod slidably passing through the support base to be connected to the sliding base, a link, and a driving rod having a bending portion and a handle portion. An end of the link is pivoted to the sliding rod. The bending portion is pivoted to another end of the link and the support base respectively for driving the sliding rod via the link to slide relative to the support base, so that the sliding base could be pushed by the sliding rod to drive a cable device placed on the sliding base to insert into a slot of the circuit board.

10 Claims, 4 Drawing Sheets

CABLE INSTALLATION TOOL

BACKGROUND OF THE INVENTION

1. Field of the Invention

The present invention relates to a tool, and more specifically, to a cable installation tool for inserting a cable device into a slot of a circuit board.

2. Description of the Prior Art

In general, a conventional computer apparatus (e.g. a notebook or a desktop computer) adopts a cable connecting method to establish electricity or signal transmission between a circuit board and other computer components (e.g. a power supply or a hard disk drive). The cable connecting method commonly seen in the prior art is to push a cable device to insert into a corresponding slot on the circuit board by a user's fingers. Furthermore, for preventing disengagement of the cable device from the slot when the computer apparatus receives sudden impact, the cable device usually needs to be inserted into the slot in a tightly fitting manner, so that the cable device could be installed on the circuit board steadily.

However, since the cable device needs to be inserted into the slot tightly, the aforesaid method requires the user to utilize his fingers to push the cable device hard. Thus, it is time-consuming and strenuous for the user to perform the cable installation operation of the computer apparatus, so as to cause the user much inconvenience. Furthermore, it may also cause the problem that the cable device or the slot could damage easily due to excessive force exerted by the user as well as the problem that the user's fingers could be cut by the cable device or the slot accidentally due to the improper operation of the user.

SUMMARY OF THE INVENTION

An objective of the present invention is to provide a cable installation tool for inserting a cable device into a slot of a circuit board, to solve the aforesaid problem.

The present invention provides a cable installation tool for inserting a cable device into a slot of a circuit board. The cable installation tool includes a baseboard, a support base, a sliding base, a sliding rod, a link, and a driving rod. The baseboard has a containing space for containing the circuit board. The support base is disposed on the baseboard. The sliding base is slidably disposed on the baseboard and located at a side of the support base for placing the cable device. The sliding rod slidably passes through the support base to be connected to the sliding base. An end of the link is pivoted to the sliding rod. The driving rod has a bending portion and a handle portion. The bending portion is pivoted to another end of the link and the support base respectively to make the handle portion rotatable relative to the support base. The bending portion is used for driving the sliding rod via the link to slide relative to the support base when the handle portion is rotated relative to the support base, so that the sliding base could be pushed to an installation position by the sliding rod to drive the cable device placed on the sliding base to insert into the slot, or could be pulled to a release position to make the circuit board detachable from the containing space.

According to the claimed invention, the cable device has a cable plug and a cable set and a line management groove is formed on the sliding base for containing the cable set. The sliding base pushes the cable plug to insert into the slot when being pushed to the installation position.

According to the claimed invention, at least one positioning groove is further formed on the sliding base and the at least one positioning groove abuts against the circuit board so as to make the circuit board positioned in the containing space when the sliding base is pushed to the installation position.

According to the claimed invention, the baseboard further has a plurality of positioning blocks to define the containing space.

According to the claimed invention, the support base has an auxiliary support block and the auxiliary support block is disposed under the sliding rod for supporting the sliding rod.

According to the claimed invention, at least one guide rod extends from the sliding base and the guide rod slidably passes through the auxiliary support block to guide sliding of the sliding base relative to the support base.

In summary, compared with the prior art in which the user must utilize his fingers to push the cable device to insert into the slot of the circuit board, the present invention utilizes the linkage mechanism composed of the driving rod, the link, the sliding rod, and the sliding base, to make the sliding base slide relative to the support base with rotation of the driving rod, so that the sliding base could push the cable device to insert into the slot. In such a manner, it is time-saving and effortless for the user to operate the cable installation tool provided by the present invention to install the cable device on the circuit board, so as to improve convenience of the cable installation operation of the computer apparatus. Furthermore, since the present invention does not require the user to utilize his fingers to push the cable device, the cable installation tool provided by the present invention could further solve the prior art problem that the cable device or the slot could damage easily due to excessive force exerted by the user, and could effectively prevent the user's fingers from being cut by the cable device or the slot accidentally.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
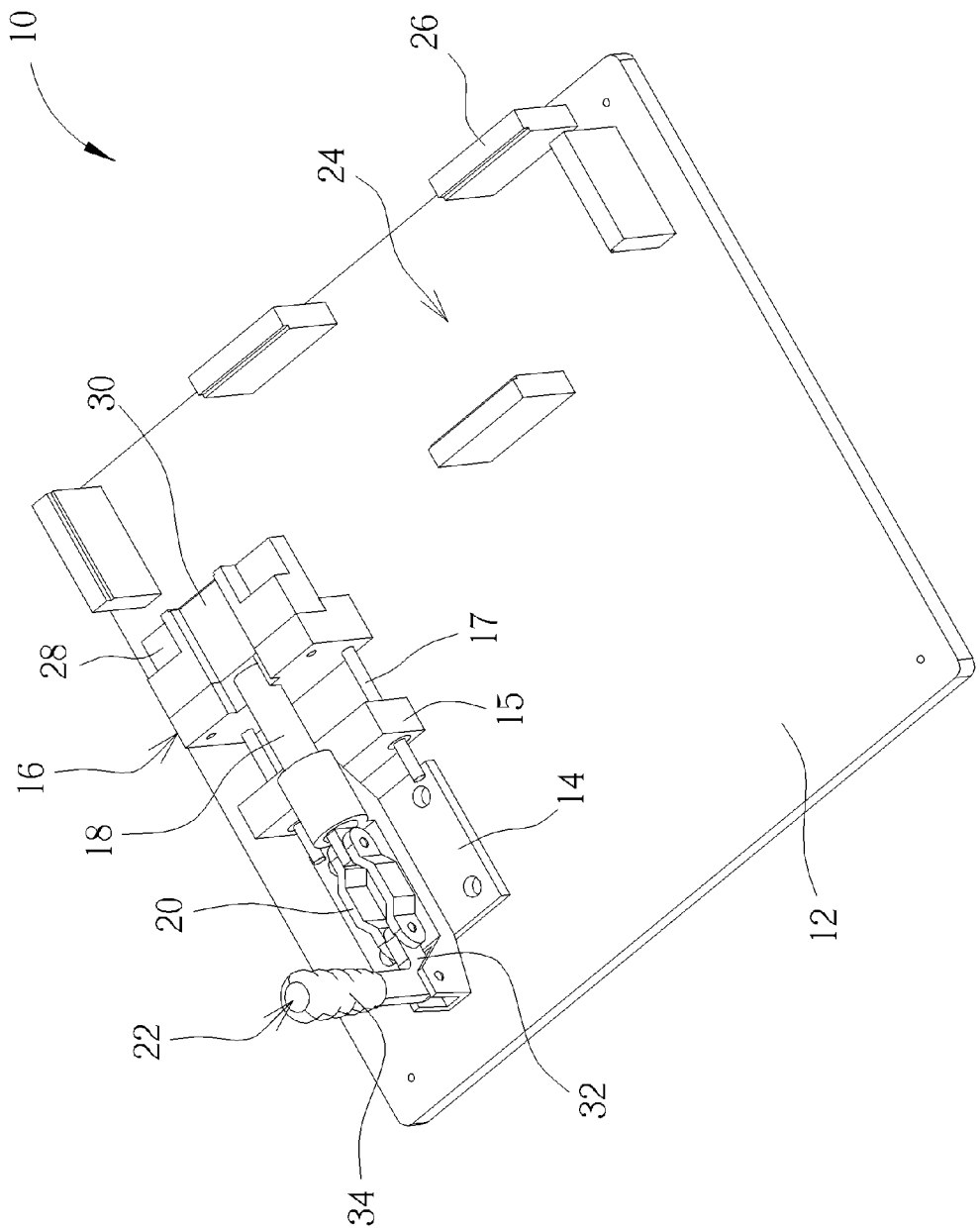
FIG. 1 is a diagram of a cable installation tool according to an embodiment of the present invention.

Please refer to FIG. 1, which is a diagram of a cable installation tool 10 according to an embodiment of the present invention. The cable installation tool 10 is used for inserting a cable device into a slot of a circuit board. As shown in FIG. 1, the cable installation tool 10 includes a baseboard 12, a support board 14, a sliding base 16, a sliding rod 18, a link 20, and a driving rod 22. The baseboard 12 has a containing space 24 for providing a circuit board containing function. In this embodiment, the baseboard 12 could further have a plurality of positioning blocks 26 (five shown in FIG. 1, but not limited thereto). The plurality of positioning blocks 26 could be utilized as the borders of the containing space 24 in a discontinuous arrangement so as to define the containing space 24, but not limited thereto. In other words, the baseboard 12 could adopt other space forming design commonly seen in the prior art, such as forming a containing groove or a containing wall on the baseboard 12.

The support base 14 is disposed on the baseboard 12. The sliding base 16 is slidably disposed on the baseboard 12 and located at a side of the support base 14 for providing a cable placing function. The sliding rod 18 slidably passes through the support base 14 to be connected to the sliding base 16. Accordingly, with sliding of the sliding rod 18, the sliding base 16 could slide forward or backward on the baseboard 12 relative to the support base 14. In practical application, the support base 14 could have an auxiliary support block 15. The auxiliary support block 15 is disposed under the sliding rod 18 for supporting the support rod 18, so that the sliding rod 18 could slide on the support base 14 more steadily. Furthermore, in this embodiment, at least one guide rod 17 (two shown in FIG. 1, but not limited thereto) could extend from the sliding base 16. The guide rod 17 could slidably pass through the auxiliary support base block 15 for guiding sliding of the sliding base 16 on the baseboard 12, so as to ensure that the sliding base 16 could slide in a straight line on the support base 14.

Furthermore, in this embodiment, at least one positioning groove 28 (two shown in FIG. 1, but not limited thereto) could be further formed on the sliding base 16. The positioning groove 28 is used for abutting against a circuit board contained in the containing space 24 so as to make the circuit board positioned in the containing space 24 more steadily. Furthermore, a line management groove 30 could be further formed on the sliding base 16 to contain a cable set of a cable device for achieving the line management purpose.

As shown in FIG. 1, one end of the link 20 is pivoted to the sliding rod 18 and the driving rod 22 has a bending portion 32 and a handle portion 34. The bending portion 32 is pivoted to another end of the link 20 and the support base 14 respectively, so that the handle portion 34 could utilize the bending portion 32 as a pivot shaft to rotate relative to the support base 14. Via the aforesaid linkage design, the bending portion 32 could be used for driving the sliding rod 18 via the link 20 to slide relative to the support base 14 so as to push or pull the sliding base 16 to slide on the baseboard 12 when the handle portion 34 is rotated relative to the support base 14.

Figure 2:
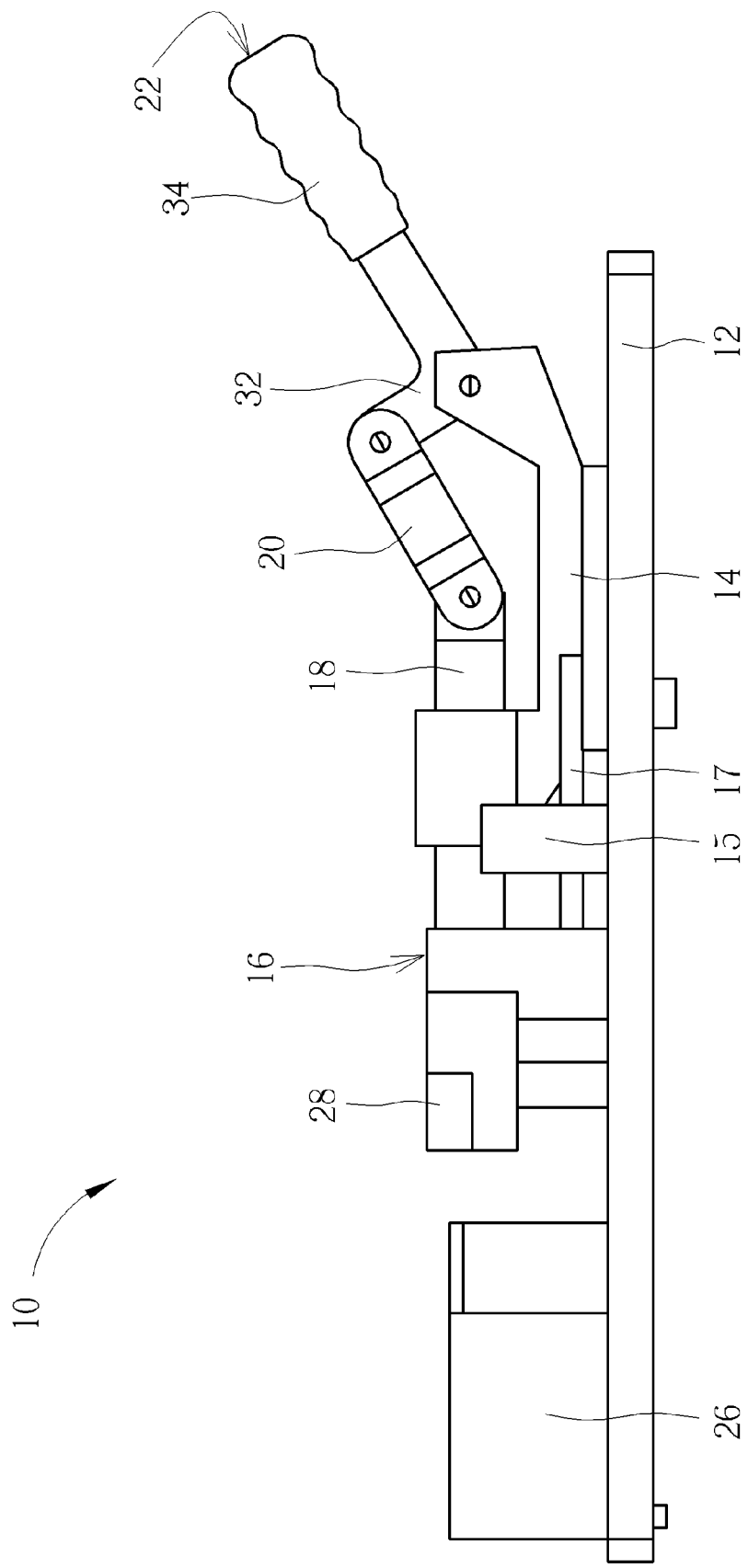
FIG. 2 is a side view of a sliding base in FIG. 1 moving to a release position.
Figure 3:
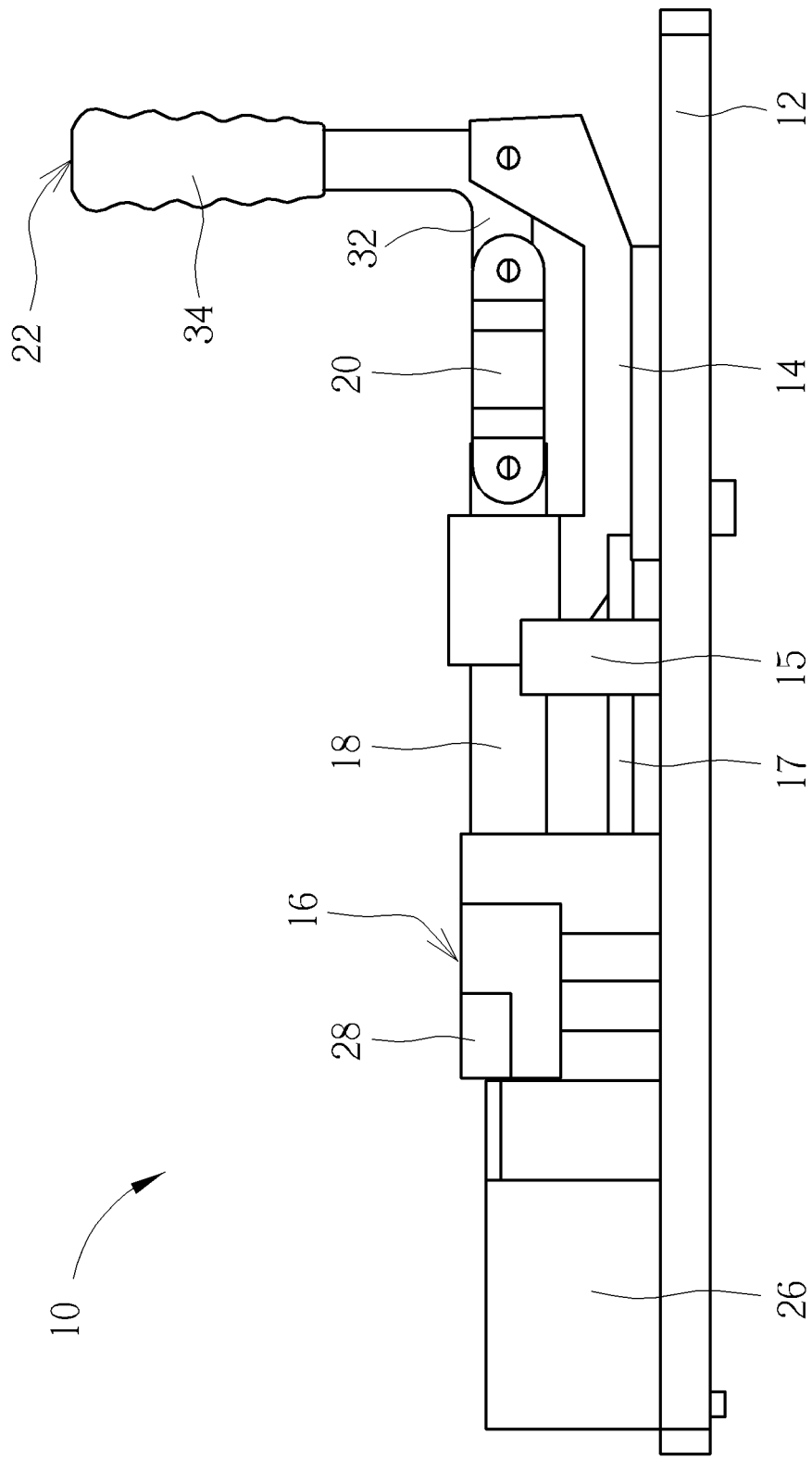
FIG. 3 is a side view of the sliding base in FIG. 2 moving to an installation position.
Figure 4:
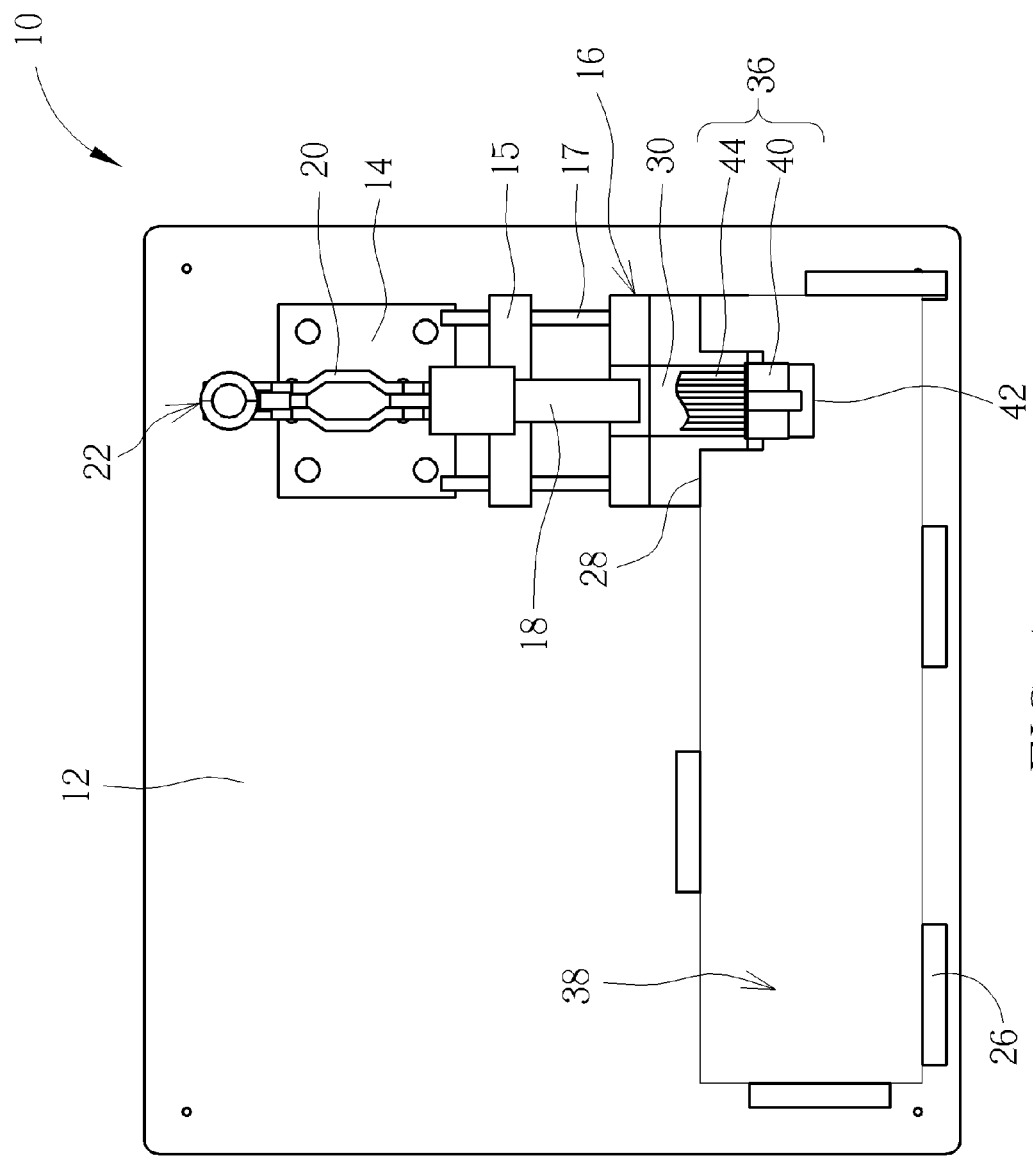
FIG. 4 is a top view of the sliding base in FIG. 1 pushing a cable plug of a cable device to insert into a slot of a circuit board.

In the following, the cable installation operation of the cable installation tool 10 for installing a cable device 36 on a circuit board 38 is described in detail. Please refer to FIG. 1, FIG. 2, FIG. 3, and FIG. 4. FIG. 2 is a side view of the sliding base 16 in FIG. 1 moving to a release position. FIG. 3 is a side view of the sliding base 16 in FIG. 2 moving to an installation position. FIG. 4 is a top view of the sliding base 16 in FIG. 1 pushing a cable plug 40 of the cable device 36 to insert into a slot 42 of the circuit board 38. The cable device 36 could be a conventional cable apparatus (e.g. a power supply cable) and have the cable plug 40 and a cable set 44 (partially shown in FIG. 4). When a user wants to utilize the cable installation tool 10 to install the cable device 36 on the circuit board 38, the user could place the circuit board 38 in the containing space 24 defined by the positioning blocks 26 in FIG. 1, and then could place the cable set 44 of the cable device 36 in the line management groove 30 of the sliding base 16. Subsequently, the user could exert force on the handle portion 34 to make the handle portion 34 rotate from a position as shown in FIG. 2 to a position as shown in FIG. 3 relative to the support base 14. Accordingly, the bending portion 32 could drive the sliding rod 18 via the link 20 to slide relative to the support base 14, so that the sliding base 16 could be pushed to slide to the installation position as shown in FIG. 4. In such a manner, during the aforesaid process, the sliding base 16 could abut against the cable plug 40 and then push the cable plug 40 to insert into the slot 42 of the circuit board 38 so as to complete the cable installation operation of the cable installation tool 10. To be noted, when the sliding base 16 is pushed to the installation position as shown in FIG. 4, the positioning groove 28 of the sliding base 16 could further abut against the circuit board 38 so as to make the circuit board 38 positioned among the positioning blocks 26 steadily to ensure that the cable plug 40 could be precisely inserted into the slot 42 of the circuit board 38.

On the other hand, when the user wants to take the circuit board 38 out of the baseboard 12, the user just needs to exert force on the handle portion 34 to rotate from the position as shown in FIG. 3 to the position as shown in FIG. 2 relative to the support base 14. Accordingly, with rotation of the handle portion 34, the bending portion 32 could drive the sliding rod 18 via the link 20 to slide relative to the support base 14, so that the sliding base 16 could be pulled to slide from the installation position as shown in FIG. 3 back to the release position as shown in FIG. 2. At this time, since the sliding base 16 no longer abuts against the cable plug 40 and the positioning groove 28 no longer abuts against the circuit board 38, the circuit board 38 could be detached from the plurality of positioning blocks 26. Thus, the user could take the circuit board 38 having the cable device 36 installed thereon out of the baseboard 12 conveniently, so that the user could continue to utilize the cable installation tool 10 to perform the subsequent cable installation operation.

In summary, compared with the prior art in which the user must utilize his fingers to push the cable device to insert into the slot of the circuit board, the present invention utilizes the linkage mechanism composed of the driving rod, the link, the sliding rod, and the sliding base, to make the sliding base slide relative to the support base with rotation of the driving rod, so that the sliding base could push the cable device to insert into the slot. In such a manner, it is time-saving and effortless for the user to operate the cable installation tool provided by the present invention to install the cable device on the circuit board, so as to improve convenience of the cable installation operation of the computer apparatus. Furthermore, since the present invention does not require the user to utilize his fingers to push the cable device, the cable installation tool provided by the present invention could further solve the prior art problem that the cable device or the slot could damage easily due to excessive force exerted by the user, and could effectively prevent the user's fingers from being cut by the cable device or the slot accidentally.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cable installation tool for inserting a cable device into a slot of a circuit board, the cable installation tool comprising:
    a baseboard having a containing space for containing the circuit board;
    a support base disposed on the baseboard;
    a sliding base slidably disposed on the baseboard and located at a side of the support base for placing the cable device;
    a sliding rod slidably passing through the support base to be connected to the sliding base;
    a link, an end of the link being pivoted to the sliding rod; and
    a driving rod having a bending portion and a handle portion, the bending portion being pivoted to another end of the link and the support base respectively to make the handle portion rotatable relative to the support base, the bending portion being for driving the sliding rod via the link to slide relative to the support base when the handle portion is rotated relative to the support base, so that the sliding base could be pushed to an installation position by the sliding rod to drive the cable device placed on the sliding base to insert into the slot, or could be pulled to a release position to make the circuit board detachable from the containing space.

2. The cable installation tool of claim 1, wherein the cable device has a cable plug and a cable set, a line management groove is formed on the sliding base for containing the cable set, and the sliding base pushes the cable plug to insert into the slot when being pushed to the installation position.

3. The cable installation tool of claim 2, wherein at least one positioning groove is further formed on the sliding base, and the at least one positioning groove abuts against the circuit board so as to make the circuit board positioned in the containing space when the sliding base is pushed to the installation position.

4. The cable installation tool of claim 3, wherein the baseboard further has a plurality of positioning blocks to define the containing space.

5. The cable installation tool of claim 4, wherein the support base has an auxiliary support block, and the auxiliary support block is disposed under the sliding rod for supporting the sliding rod.

6. The cable installation tool of claim 5, wherein at least one guide rod extends from the sliding base, and the guide rod slidably passes through the auxiliary support block to guide sliding of the sliding base relative to the support base.

7. The cable installation tool of claim 1, wherein at least one positioning groove is further formed on the sliding base, and the at least one positioning groove abuts against the circuit board so as to make the circuit board positioned in the containing space when the sliding base is pushed to the installation position.

8. The cable installation tool of claim 1, wherein the baseboard further has a plurality of positioning blocks to define the containing space.

9. The cable installation tool of claim 1, wherein the support base has an auxiliary support block, and the auxiliary support block is disposed under the sliding rod for supporting the sliding rod.

10. The cable installation tool of claim 9, wherein at least one guide rod extends from the sliding base, and the guide rod slidably passes through the auxiliary support block to guide sliding of the sliding base relative to the support base.

* * * * *